United States Patent
Chen (10) Patent No.: US 11,295,132 B2
(45) Date of Patent: Apr. 5, 2022

(54) METHOD, A DEVICE FOR ASSISTING DRIVING, AN UNMANNED DEVICE AND A READABLE STORAGE MEDIUM

(71) Applicant: Baidu Online Network Technology (Beijing) Co., Ltd., Haidian District Beijing (CN)

(72) Inventor: Youhan Chen, Haidian District Beijing (CN)

(73) Assignee: Baidu Online Network Technology(Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/516,065

(22) Filed: Jul. 18, 2019

(65) Prior Publication Data

US 2020/0082171 A1    Mar. 12, 2020

(30) Foreign Application Priority Data

Sep. 7, 2018   (CN) .......................... 201811045954.9

(51) Int. Cl.
*G06K 9/00* (2006.01)
*G06F 3/01* (2006.01)
(Continued)

(52) U.S. Cl.
CPC ........ *G06K 9/00671* (2013.01); *B64C 39/024* (2013.01); *G05D 1/0022* (2013.01);
(Continued)

(58) Field of Classification Search
CPC ..................... G06K 9/00671; G06K 9/00791; G06F 3/011; G05D 1/0022; G05D 1/0044;
(Continued)

(56) References Cited

U.S. PATENT DOCUMENTS

2007/0097206 A1*   5/2007   Houvener ............ H04N 13/344
                                                                  348/26
2014/0278045 A1    9/2014   Cheng et al.
(Continued)

FOREIGN PATENT DOCUMENTS

CN    106251403 A    12/2016
CN    106303497 A    1/2017
(Continued)

OTHER PUBLICATIONS

European Search Report dated Aug. 7, 2019 regarding Application No. 19180898.9-1208; 5 pages.
(Continued)

*Primary Examiner* — William A Beutel
(74) *Attorney, Agent, or Firm* — Pearne & Gordon LLP (57) ABSTRACT

The present disclosure provides a method, a device for assisting driving, an unmanned device and a readable storage medium, where the method includes: the unmanned device triggers remote assisting automatic driving function, receiving the scene information captured by the unmanned device; processing the scene information, generating a VR scene; displaying the VR scene for a user, so that the user can trigger a remote assisting driving operation according to the VR scene; where the remote assisting driving operation is used to control the unmanned device to execute a driving operation. Thus providing a VR scene of the environment where the unmanned device is located, improving effectively user's environment engagement and perception of actual environment, which is helpful for the user to trigger an accurate remote assisting driving instruction, thus to ensure the driving safety of the unmanned device.

18 Claims, 5 Drawing Sheets

(51) Int. Cl.
  *G05D 1/00* (2006.01)
  *B64C 39/02* (2006.01)
(52) U.S. Cl.
  CPC ........... *G05D 1/0044* (2013.01); *G06F 3/011*
    (2013.01); *G06K 9/00791* (2013.01); *B64C*
    *2201/141* (2013.01)
(58) Field of Classification Search
  CPC ............ G05D 2201/0213; G05D 1/021; B64C
    39/024; B64C 2201/141; H04N 7/185;
    H04N 7/18
  See application file for complete search history.

(56) References Cited

U.S. PATENT DOCUMENTS

| | | | | |
|---|---|---|---|---|
| 2015/0248131 | A1* | 9/2015 | Fairfield | G05D 1/0038 701/2 |
| 2017/0076617 | A1* | 3/2017 | Schupp | G01S 19/13 |
| 2017/0357255 | A1* | 12/2017 | Li | G05D 1/0038 |
| 2018/0364885 | A1* | 12/2018 | Melencio | G06F 3/015 |
| 2019/0092345 | A1* | 3/2019 | Zhu | B60W 50/14 |

FOREIGN PATENT DOCUMENTS

| | | | |
|---|---|---|---|
| CN | 106394545 | A | 2/2017 |
| CN | 107153363 | A | 9/2017 |
| CN | 107589745 | A | 1/2018 |
| CN | 107850895 | A | 3/2018 |
| JP | 2011150516 | | 8/2011 |
| JP | 2011150516 | A * | 8/2011 |
| JP | 2013114321 | A | 6/2013 |
| JP | 2014048859 | A | 3/2014 |

OTHER PUBLICATIONS

Zhong et al., "Mobile Robot Teleoperation System Based on Remote Reality", Department of Automation—Xiamen University, Xiamen, China; Copyright 2011, 4 pages.
The Oral Proceeding of Parallel EP Application No. 19 180 898.9-1208 dated Aug. 3, 2020; 7 pages.
Hosseini, et al., Enhancing Telepresence during the Teleoperation of Road Vehicles using HMD-based Mixed Reality, 2016 IEEE Intelligent Vehicles Symposium (IV); Gothenburg, Sweden, Jun. 19-22, 2016; 8 pages.
Bodell, et at., Teleoperation of Autonomous Vehicle, Chalmers University of Technology, Department of Signals and Systems; Gothenburg, Sweden, 2016; 70 pages.
The First Office Action of the parallel JP application No. 2019-127347; 3 pages.
CNBLUSP201904424—The second Office Action of the parallel JP application dated Apr. 22, 2021; 4 pages.

* cited by examiner

_METHOD, A DEVICE FOR ASSISTING DRIVING, AN UNMANNED DEVICE AND A READABLE STORAGE MEDIUM_

CROSS-REFERENCE TO RELATED APPLICATIONS

This application claims priority to Chinese Patent Application No. 201811045954.9, filed on Sep. 7, 2018, which is hereby incorporated by reference in its entirety.

TECHNICAL FIELD

The present disclosure relates to the field of automatic driving technologies and, in particular, to a method, a device for assisting driving, an unmanned device and a readable storage medium.

BACKGROUND

With the development of science and technology and the progress of society, automatic driving technology has become a trend in the field of transportation. While an unmanned device performing an automatic driving task, once encountered with complicated topography or complicated road conditions, the problem that the unmanned device fails to continue performing the automatic driving task may easily occur. At this tune, the unmanned device may trigger remote assisting automatic driving function.

In the process of remote assisting automatic driving, a user may provide remote assistance of automatic driving to an unmanned vehicle via an assisting automatic driving device which is remotely located. In the known art, the assisting automatic driving device displays to the user the scene where the unmanned device is located via a flat panel. However, merely depending on planar video images, the user may not perceive the distance between the unmanned device and surrounding obstacles, and as lacking of environment engagement and perception of actual environment, the user may trigger an incorrect instruction for remote assisting driving, a safety threat to the unmanned may be raised.

SUMMARY

To address the above mentioned problem in the existing process of remote assisting automatic driving that the user merely depends on planar video images to obtain the distance between the unmanned device and surrounding obstacles, lacking of environment engagement and perception of actual environment, may trigger the incorrect instruction for remote assisting driving, and the safety threat to the unmanned may be raised, the present disclosure provides a method, a device for assisting driving, an unmanned device and a readable storage medium.

The first aspect, the present disclosure provides a method for assisting driving, including:

receiving scene information captured by an unmanned device, when the unmanned device triggers a remote assisting automatic driving function;

processing the scene information, generating a VR scene (i.e. Virtual Reality scene); and displaying the VR, scene for a user, so that the user can trigger a remote assisting driving operation according to the VR scene; where the remote assisting driving operation is used to control the unmanned device to execute a driving operation.

In an alternative embodiment, wherein the scene information includes image information of multiple environment angles of the unmanned device under the current environment; wherein, the image information of multiple environment angles is captured by the unmanned device at the same time;

correspondingly, the processing the scene information generating a VR scene includes:

synthesizing and obtaining, according to the environment angles corresponding to respective image information, environment image information of the current environment;

performing visual image processing to the environment image information, so as to obtain the VR scene including left eye environment image information and right eye environment image information.

In an alternative embodiment, wherein the scene information on includes video information of multiple environment angles of the unmanned device under the current environment;

correspondingly, the processing the scene information generating a VR scene includes:

performing framing processing to the video information of multiple environment angles, so as to obtain image data of multiple environment angles corresponding to one frame;

performing visual image processing to the image data of multiple environment angles of every frame, so as to obtain left eye environment image data and right eye environment image data of every frame;

obtaining the VR scene, according to the left eye environment image data and the right eye environment image data of every frame.

In an alternative embodiment, after the displaying the VR scene for a user, the method further including:

receiving the remote assisting driving operation triggered by the user;

generating a corresponding operation instruction according to the remote assisting driving operation, and transmitting it to the unmanned device, so that the unmanned device executes the driving operation according to the operation instruction.

In an alternative embodiment, when the unmanned device triggers the remote assisting automatic driving function, the method further including:

receiving at least one of a current configuration parameter of the unmanned device, an operating parameter of the unmanned device, and a measurement parameter of the environment where the unmanned device is located;

while displaying the VR scene to the user, at the same time displaying at least one of the current configuration parameter of the unmanned device, the operating parameter of the unmanned device, and the measurement parameter of the environment where the unmanned device is located.

In an alternative embodiment, the receiving scene information captured by the unmanned device, including:

receiving the scene information transmitted by the unmanned device via a 5G mobile communication network.

The second aspect, the present disclosure provides a method for assisting driving, including:

capturing scene information, when remote assisting automatic driving function is triggered;

transmitting the scene information to a device for assisting driving, enabling the device for assisting driving to process the scene information, generate a VR scene, and display the VR scene for a user.

In an alternative embodiment, after the transmitting the scene information to the device for assisting driving, the method further including:

receiving and executing a remote assisting driving operation instruction returned by the device for assisting driving, the remote assisting driving operation instruction is triggered by the user according to the VR scene.

The third aspect, the present disclosure provides a device for assisting driving, including:

a communication unit, configured to receive scene information captured by an unmanned device when the unmanned device triggers remote assisting automatic driving function;

a VR scene generating unit, configured to process the scene information, generate a VR scene; and a VR scene interacting unit, configured to display the VR scene for a user, so that the user can trigger a remote assisting driving operation according to the VR scene; where the remote assisting driving operation is used to control the unmanned device to execute the driving operation.

In an alternative embodiment, wherein the scene information includes image information of multiple environment angles of the unmanned device under the current environment; wherein, the image information of multiple environment angles is captured by the unmanned device at the same time;

wherein the VR scene generating unit is specifically configured to, synthesize and obtain, according to the environment angles corresponding to respective image information, environment image information of the current environment;

perform visual image processing to the environment image information, so as to obtain the VR scene including left eye environment image information and right eye environment image information.

In an alternative embodiment, wherein the scene information includes video information of multiple environment angles of the unmanned device under the current environment;

wherein the VR scene generating unit is specifically configured to, perform framing processing to the video information of multiple environment angles, so as to obtain image data of multiple environment angles corresponding to one frame;

perform visual image processing to the image data of multiple environment angles of every frame, so as to obtain left eye environment image data and right eye environment image data of every frame;

according to the left eye environment image data and the right eye environment image data of every frame, obtain the VR scene.

In an alternative embodiment, the device further including: operation instruction generating unit;

the VR scene interacting unit is configured to receive a remote assisting driving operation triggered by the user, after the displaying the VR scene for a user;

the operation instruction generating unit is configured to generate a corresponding operation instruction according to the remote assisting driving operation, such that the communication unit can transmit the operation instruction to the unmanned device, the operation instruction is used for the unmanned device to execute the driving operation.

In an alternative embodiment, the communication unit is further configured to receive a current configuration parameter of the unmanned device, an operating parameter of the unmanned device, and/or, a measurement parameter of the environment where the unmanned device is located;

the VR scene interacting unit is further configured to, while displaying the VR scene to the user, at the same time display the current configuration parameter of the unmanned device, the operating parameter of the unmanned device, and/or, the measurement parameter of the environment where the unmanned device is located.

In an alternative embodiment, the communication unit is specifically configured to receive the scene information transmitted by the unmanned device via a 5G mobile communication network.

The fourth aspect, the present disclosure provides an unmanned device, including:

a capturing unit, configured to capture scene information, when remote assisting automatic driving function is triggered;

a transceiver unit, configured to transmit the scene information to a device for assisting driving, enabling the device for assisting driving to process the scene information, generate a VR scene, and display the VR, scene for a user.

In an alternative embodiment, further including an executing unit:

the transceiver unit, further configured to receive a remote assisting driving operation instruction returned by the device for assisting driving, the remote assisting driving operation instruction is triggered by the user according to the VR scene;

the executing unit, configure to execute the remote assisting driving operation instruction.

The fifth aspect, the present disclosure provides a device for assisting driving, including: a display device, a memory, a processor coupled to the memory, and a computer program stored in the memory and executable on the processor, the processor is configured to execute the computer program so as to perform the above-described method;

the display device is coupled to the memory and the processor, and configure to display a VR scene for a user by means of VR technology.

The sixth aspect, the present disclosure provides an unmanned device, including: a memory, a processor coupled to the memory, and a computer program stored in the memory and executable on the processor, the processor is configured to execute the computer program so as to perform the above-described method.

The seventh aspect, the present disclosure provides a computer-readable medium including a program, and when the program code is executed by a terminal, the above-described method is performed by the terminal.

The eighth aspect, the present disclosure provides a computer-readable medium including a program, and when the program code is executed by a terminal, the above-described method is performed by the terminal.

The method, the device for assisting driving, the unmanned device and readable storage medium provided in the present disclosure achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation.

BRIEF DESCRIPTION OF DRAWINGS

Specific embodiments of the present disclosure are shown in the drawings, and will be described in more detail below.

FIG. 1 is a schematic diagram of a network architecture that the present disclosure based on;

The accompanying drawings herein are incorporated in and constitute part of this specification, illustrating embodiments consistent with the present disclosure, and used together with the specification to explain the principles of the present disclosure.

DESCRIPTION OF EMBODIMENTS

In order to make objectives, technical solutions and advantages of the embodiments of the present disclosure more clear, the technical solutions of the embodiments of the present disclosure will be described in detail below, in conjunction with accompanying, drawings.

With the development of science and technology and progress of the society, automatic driving technology has become a trend in the field of transportation. While an unmanned device performing an automatic driving task, once encountered with complicated topography or complicated road conditions, the problem that the unmanned device fails to continue performing the automatic driving task may easily occur. At this time, the unmanned device may trigger remote assisting automatic driving, function.

In the process of remote assisting automatic driving, a user may provide remote assistance of automatic driving to an unmanned vehicle via an assisting automatic driving device which is remotely located. In the known art, the assisting automatic driving, device displays to the user the scene where the unmanned device is located via a flat panel. However, merely depending on planar video images, the user may not perceive the distance between the unmanned device and surrounding obstacles, and as lacking of environment engagement and perception of actual environment, the user may trigger an incorrect instruction for remote assisting driving, a safety threat to the unmanned may be raised.

To address the above mentioned problem in the existing, process of remote assisting automatic driving that the user merely depends on planar video images to obtain the distance between the unmanned device and surrounding obstacles, lacking of environment engagement and perception of actual environment, may trigger the incorrect instruction for remote assisting driving, and the safety threat to the unmanned may be raised, the present disclosure provides a method, a device for assisting driving, an unmanned device and a readable storage medium. It should be noted that the method, the device for assisting driving, and the readable storage medium can be widely used in scenarios where remote assisting driving is needed for unmanned devices, these scenarios include but not limited to: scenarios where pilotless mobile devices like pilotless vehicles, pilotless aircrafts performing an automatic driving task, scenarios where engineering robots, maintenance robots performing engineering tasks at engineering spot or maintenance spot.

Figure 1:
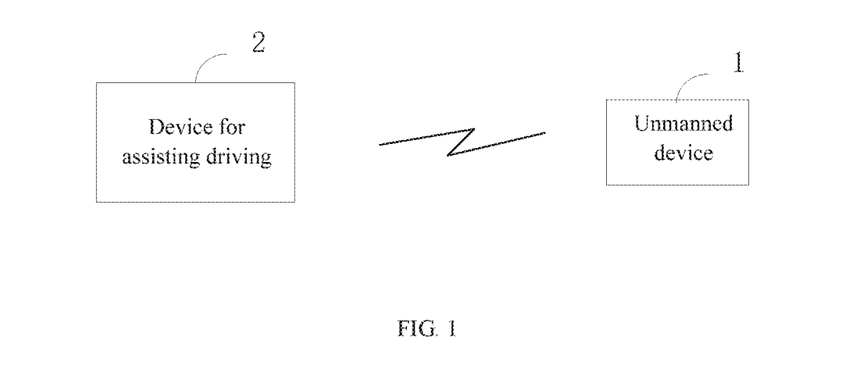

FIG. 1 is a schematic diagram of a network architecture that the present disclosure based on, as is shown in FIG. 1, the network architecture that the present disclosure based on at least including an unmanned device 1, and a device for assisting driving 2. Where an unmanned device 1 may include but not limited to manned or unmanned mobile devices capable of performing an automatic driving task, such as pilotless vehicles, pilotless aircrafts, even more, an unmanned device 1 may include but not limited to mobile devices used to perform engineering tasks, such as engineering robots, maintenance robots, firefighting robot. A device for assisting driving 2 may be consisted of hardware/software structure, whose interaction and processing of data may utilize any server in a server cluster, whose presentation and interaction of scene may utilize interactive device and display device entities.

Figure 2:
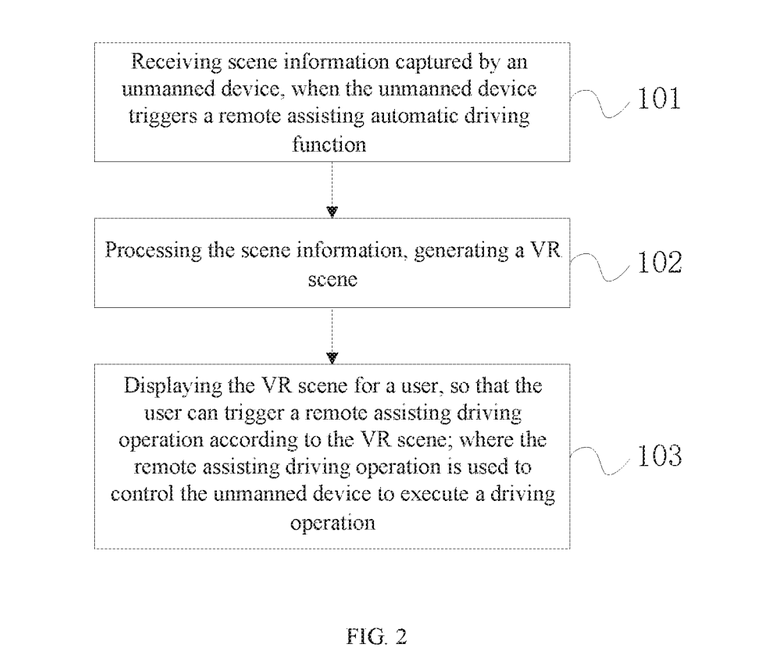
FIG. 2 is a schematic flowchart of a method for assisting driving according to a first embodiment of the present disclosure.

FIG. 2 is a schematic flowchart of a method for assisting driving according to a first embodiment of the present disclosure.

As is shown in FIG. 2, the method for assisting driving including:

Step 101, receiving scene information captured by an unmanned device, when the unmanned device triggers a remote assisting automatic driving function.

Step 102, processing the scene information, generating a VR scene.

Step 103, displaying the \IR scene for a user, so that the user can trigger a remote assisting driving operation according to the VR scene; where the remote assisting driving operation is used to control the unmanned device to execute the driving operation.

The first embodiment provides a method for assisting driving, the executive body thereof is the device for assisting driving. Where a VR (Virtual Reality) scene specifically refers to a scene built by means of VR technology, the VR scene can be displayed by a VR display device for a user to view.

Specifically, the unmanned device may be performing an automatic driving task according to a preset driving route, driving strategy, or driving mode, when it encountered with problems such as complicated topography or complicated road conditions that cannot be solved on its own, it will trigger remote assisting automatic driving function. Where the trigger conditions for the unmanned device to trigger the remote assisting automatic driving function may be derived from the known art, which are not limited in the present disclosure.

When the unmanned device triggers the remote assisting automatic driving function, it initiates a request for remote assisting automatic driving to the device for assisting driving, and at the same time transmits the scene information currently captured together to the device for assisting driving for receiving and processing. Where it receives the scene information transmitted by the unmanned device via a 5G mobile communication network.

Subsequently, the device for assisting driving will process the scene information received, generate a corresponding VR scene. Then, display the VR scene to the user, so that the user can trigger a remote assisting driving operation according to the VR scene; where the remote assisting driving operation is used to control the unmanned device to execute the driving operation.

That is to say, when the unmanned device triggers the remote assisting automatic driving function, the device for assisting driving receives the scene information, which is captured by the unmanned device, of the scene where the unmanned device is located. Where the scene information includes but not limited to image information or video information captured at multiple visual angles with the unmanned device as the center. The device for assisting driving processes the scene information, so as to build a VR scene of the scene where the unmanned device is located. The user may obtain the VR scene by the device for assisting driving, and trigger a remote assisting driving operation according to the VR scene obtained, enabling the unmanned device to execute a corresponding driving operation, getting out of the current predicament.

What differs from the known art is that, the VR technology enables a user to directly watch the images with extremely high scene reproduction of the VR scene of the environment where the unmanned device is located. Compared with the known art where a user obtains the scene of environment where the unmanned device is located merely depending on planar video images, the VR scene is more close to the actual scene for the information acquisition experience of the user, which is more helpful for the user to make a decision and initiate an accurate instruction for remote assisting driving, thus the driving safety of the unmanned device can be improved.

Preferably, in the present embodiment, after displaying the VR scene for a user, the method further including: receiving a remote assisting driving operation triggered by the user; generating a corresponding operation instruction according to the remote assisting driving operation, and transmitting it to the unmanned device, so that the unmanned device executes the driving operation according to the operation instruction. Where the remote assisting driving operation matches the environment where the unmanned device is located, specifically, such as a steering operation, a braking operation, a system checking operation, an accelerating operation, a leaping operation and so on.

Preferably, in the present embodiment, when the unmanned device triggers the remote assisting automatic driving function, the method for assisting driving further including: receiving a current configuration parameter of the unmanned device, an operating parameter of the unmanned device; and/or, a measurement parameter of the environment where the unmanned device is located; while displaying the VR scene for a user, at the same time displaying at least one of the current configuration parameter of the unmanned device, the operating parameter of the unmanned device, and the measurement parameter of the environment where the unmanned device is located.

Specifically, to further provide more complete and detailed environment information for a user to make a decision, in the present embodiment, when the unmanned device triggers the remote assisting automatic driving function, the device for assisting driving will also receive at least one of the current configuration parameter of the unmanned device, the operating parameter of the unmanned device, and the measurement parameter of the environment where the unmanned device is located transmitted by the unmanned device, and synchronously display these parameters within the VR scene. Where the current configuration parameter of the unmanned device includes but not limited to: model number, automatic driving mode, the currently ongoing task of the unmanned device and so on; the operating parameter of the unmanned device includes but not limited to: speed, acceleration, vehicle processing operating status, vehicle inclination of the unmanned device and so on; the measurement parameter of the environment where the unmanned device is located includes but not limited to: the distance between the unmanned device and each obstacle in the environment where the unmanned device is located; the weather parameter of the environment where the unmanned device is located; the ground surface or topography status of the environment where the unmanned device is located and so on.

The method for assisting driving provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation.

Figure 3:
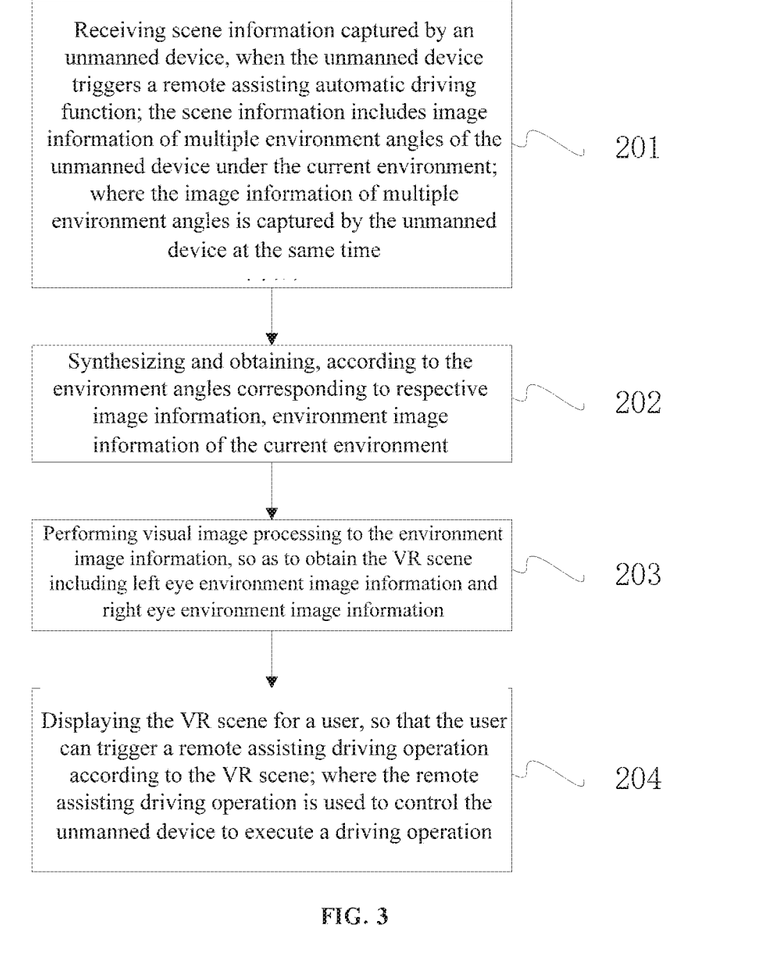
FIG. 3 is a schematic flowchart of a method for assisting driving according to a second embodiment of the present disclosure.

To further explain the method for assisting driving provided in the present disclosure, based on the first embodiment, FIG. 3 is a schematic flowchart of a method for assisting driving according to a second embodiment of the present disclosure.

As is shown in FIG. 3, the method for assisting driving including:

Step 201, receiving scene information captured by an unmanned device, when the unmanned device triggers a remote assisting automatic driving function; the scene information includes image information of multiple environment angles of the unmanned device under the current environment; where the image information of multiple environment angles is captured by the unmanned device at the same time.

Step 202, synthesizing and obtaining, according to the environment angles corresponding to respective image information, environment image information of the current environment.

Step 203, performing visual image processing to the environment image information, so as to obtain the VR scene including left eye environment image information and right eye environment image information.

Step 204, displaying the VR scene for a user, so that the user can trigger a remote assisting driving operation according to the VR scene; where the remote assisting driving operation is used to control the unmanned device to execute the driving operation.

Similarly to the first embodiment, the second embodiment provides a method for assisting driving, the executive body thereof is the device for assisting driving. Where a VR (Virtual Reality) scene specifically refers to a scene built by means of VR technology, the VR scene can be displayed by a VR display device for a user to view.

Specifically, the unmanned device may be performing an automatic driving task according to a preset driving route, driving strategy, or driving mode, when it encountered with problems such as complicated topography or complicated road conditions that cannot be solved on its own, it will trigger remote assisting automatic driving function. Where the trigger conditions for the unmanned device to trigger the remote assisting automatic driving function may be derived from the known art, which are not limited in the present disclosure.

When the unmanned device triggers the remote assisting automatic driving function, it initiates a request for remote assisting automatic driving to the device for assisting driving, and at the same time transmits the scene information currently captured together to the device for assisting driving for receiving and processing. Where it receives the scene information transmitted by the unmanned device via a 5G mobile communication network.

What differs from the first embodiment is that, in the present second embodiment, the scene information including image information of multiple environment angles of the unmanned device under the current environment; where the image information of multiple environment angles is captured by the unmanned device at the same time.

That is to say, image capture devices with multiple capture angles may be set on the unmanned device, these image capture devices may synchronously capture the image information of multiple environment angles of the unmanned device. After the device for assisting driving obtains the image information of multiple environment angles, the environment image information of the current environment is synthesized and obtained according to the environment angles corresponding to respective image information. Subsequently, performing visual image processing to the obtained environment image information, so as to obtain the VR scene including the left eye environment image information and the right eye environment image information.

Finally, displaying the VR scene for a user, so that the user can trigger a remote assisting driving operation according to the VR scene; where the remote assisting driving operation is used to control the unmanned device to execute the driving operation.

Preferably, in the present embodiment, after displaying the VR scene for a user, the method further including: receiving a remote assisting driving operation triggered by the user; generating a corresponding operation instruction according to the remote assisting driving operation, and transmitting it to the unmanned device, so that the unmanned device executes the driving operation according to the operation instruction. Where the remote assisting driving operation matches the environment where the unmanned device is located, specifically, such as a steering operation, a braking operation, a system checking operation, an accelerating operation, a leaping operation and so on.

Preferably, in the present embodiment, when the unmanned device triggers the remote assisting automatic driving function, the method for assisting driving further including: receiving a current configuration parameter of the unmanned device, an operating parameter of the unmanned device; and/or, a measurement parameter of the environment where the unmanned device is located; while displaying the VR scene for a user, at the same time displaying the current configuration parameter of the unmanned device, the operating parameter of the unmanned device, and/or, the measurement parameter of the environment where the unmanned device is located.

Specifically, to further provide more complete and detailed environment information for a user to make a decision, in the present embodiment, when the unmanned device triggers the remote assisting automatic driving function, the device for assisting driving will also receive the current configuration parameter of the unmanned device, the operating parameter of the unmanned device, and/or, the measurement parameter of the environment where the unmanned device is located transmitted by the unmanned device, and synchronously display these parameters within the VR scene. Where the current configuration parameter of the unmanned device includes but not limited to: model number, automatic driving mode, the currently ongoing task of the unmanned device and so on; the operating parameter of the unmanned device includes but not limited to: speed, acceleration, vehicle processing operating status, vehicle inclination of the unmanned device and so on; the measurement parameter of the environment where the unmanned device is located includes but not limited to: the distance between the unmanned device and each obstacle in the environment where the unmanned device is located; the weather parameter of the environment where the unmanned device is located; the ground surface or topography status of the environment where the unmanned device is located and so on.

The method for assisting driving provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation.

Figure 4:
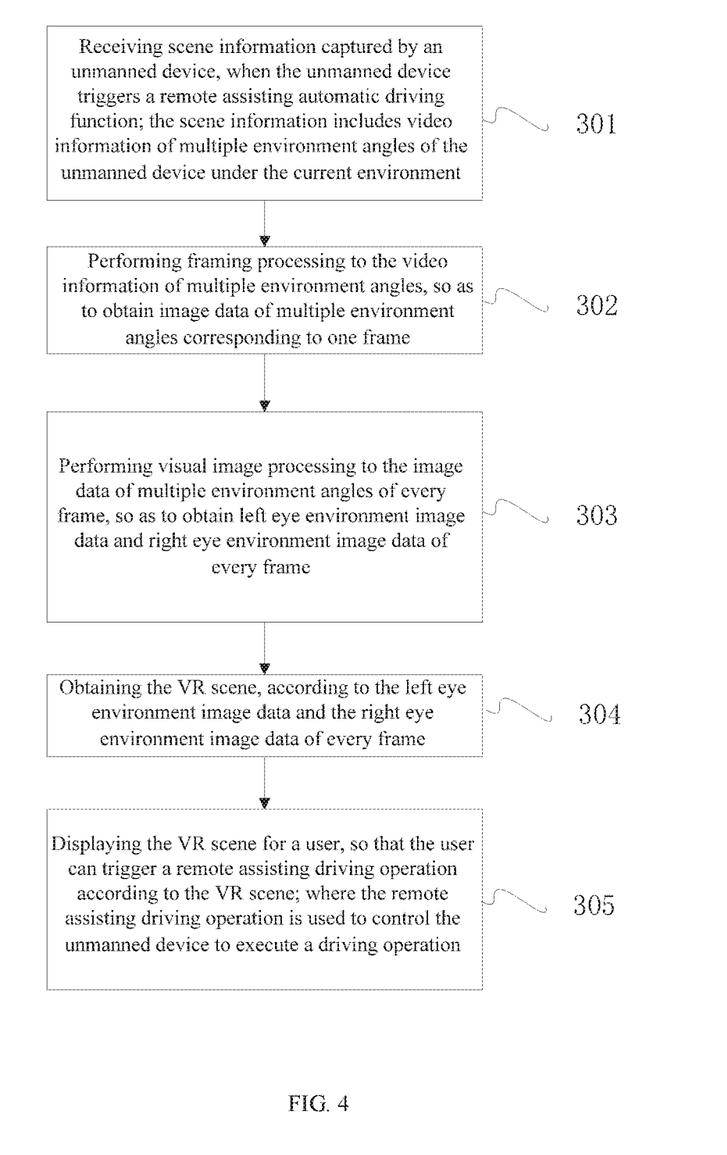
FIG. 4 is a schematic flowchart of a method for assisting driving according to a third embodiment of the present disclosure.

Based on the first embodiment, FIG. 4 is a schematic flowchart of a method for assisting driving according to a third embodiment of the present disclosure.

As is shown in FIG. 4, the method for assisting driving including:

Step 301, receiving scene information captured by an unmanned device, when the unmanned device triggers a remote assisting automatic driving function; the scene information includes video information of multiple environment angles of the unmanned device under the current environment.

Step 302, performing framing processing to the video information of multiple environment angles, so as to obtain image data of multiple environment angles corresponding to one frame.

Step 303, performing visual image processing to the image data of multiple environment angles of every frame, so as to obtain left eye environment image data and right eye environment image data of every frame.

Step 304, obtaining the VR scene, according to the left eye environment image data and the right eye environment image data of every frame.

Step 305, displaying the VR scene for a user, so that the user can trigger a remote assisting driving operation according to the VR scene; where the remote assisting driving operation is used to control the unmanned device to execute the driving operation.

Similarly to the first embodiment, the third embodiment provides a method for assisting driving, the executive body thereof is the device for assisting driving. Where a VR (Virtual Reality) scene specifically refers to a scene built by means of VR technology, the VR scene can be displayed by a VR display device for a user to view.

Specifically, the unmanned device may be performing an automatic driving task according to a preset driving route, driving strategy, or driving mode, when it encountered with problems such as complicated topography or complicated road conditions that cannot be solved on its own, it will trigger remote assisting automatic driving function. Where the trigger conditions for the unmanned device to trigger the remote assisting automatic driving function may be derived from the known art, which are not limited in the present disclosure.

When the unmanned device triggers the remote assisting automatic driving function, it initiates a request for remote assisting automatic driving to the device for assisting driving, and at the same time transmits the scene information currently captured together to the device for assisting driving for receiving and processing. Where it receives the scene information transmitted by the unmanned device via a 5G mobile communication network.

What differs from the first embodiment is that, in the present third embodiment, video information of multiple environment angles of the unmanned device under the current environment is obtained.

That is to say, video capture devices with multiple capture angles may be set on the unmanned device, these video capture devices may synchronously capture the video information of multiple environment angles of the unmanned device. After the device for assisting driving obtains the video information of multiple environment angles, framing processing to the video information may be first performed, so as to obtain image data of multiple environment angles corresponding to one frame. Subsequently, performing visual image processing to the image data of multiple environment angles of every frame, so as to obtain left eye environment image data and right eye environment image data of every frame, and the VR scene is obtained according to the left eye environment image data and the right eye environment image data of every frame.

What differs from the image information that the second embodiment base on, in the present third embodiment, the scene information includes the video information, therefore, when generating the VR scene, framing processing to the video information needs to be first performed so as to obtain the image data of every frame, then performing visual image processing to the multiple image data of one frame, and images of the VR scene are generated.

Finally, displaying the VR scene for a user, so that the user can trigger a remote assisting driving operation according to the VR scene; where the remote assisting driving operation is used to control the unmanned device to execute the driving operation.

Preferably, in the present embodiment, after displaying the VR scene for a user, the method further including: receiving a remote assisting driving operation triggered by the user; generating a corresponding operation instruction according to the remote assisting driving operation, and transmitting it to the unmanned device, so that the unmanned device executes the driving operation according to the operation instruction. Where the remote assisting driving operation matches the environment where the unmanned device is located, specifically, such as a steering operation, a braking operation, a system checking operation, an accelerating operation, a leaping operation and so on.

Preferably, in the present embodiment, when the unmanned device triggers the remote assisting automatic driving function, the method for assisting driving further including: receiving a current configuration parameter of the unmanned device, an operating parameter of the unmanned device; and/or, a measurement parameter of the environment where the unmanned device is located; while displaying the VR scene for a user, at the same time displaying the current configuration parameter of the unmanned device, the operating parameter of the unmanned device, and/or, the measurement parameter of the environment where the unmanned device is located.

Specifically, to further provide more complete and detailed environment information for a user to make a decision, in the present embodiment, when the unmanned device triggers the remote assisting automatic driving function, the device for assisting driving will also receive the current configuration parameter of the unmanned device, the operating parameter of the unmanned device, and/or, the measurement parameter of the environment where the unmanned device is located transmitted by the unmanned device, and synchronously display these parameters within the VR scene. Where the current configuration parameter of the unmanned device includes but not limited to: model number, automatic driving mode, the currently ongoing task of the unmanned device and so on; the operating parameter of the unmanned device includes but not limited to: speed, acceleration, vehicle processing operating status, vehicle inclination of the unmanned device and so on; the measurement parameter of the environment where the unmanned device is located includes but not limited to: the distance between the unmanned device and each obstacle in the environment where the unmanned device is located; the weather parameter of the environment where the unmanned device is located; the ground surface or topography status of the environment where the unmanned device is located and so on.

The method for assisting driving provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation.

Figure 5:
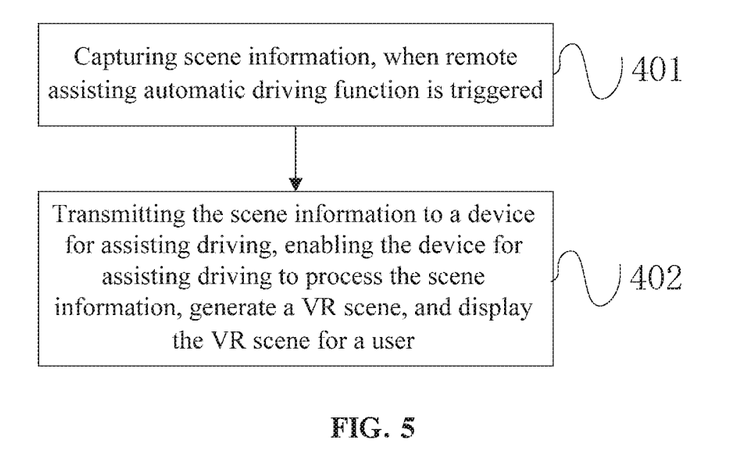
FIG. 5 is a schematic flowchart of a method for assisting driving according to a fourth embodiment of the present disclosure.

FIG. 5 is a schematic flowchart of a method for assisting driving according to a fourth embodiment of the present disclosure.

As is shown in FIG. 5, the method for assisting driving including:

Step 401, capturing scene information, when remote assisting automatic driving function is triggered;

Step 402, transmitting the scene information to a device for assisting driving, enabling the device for assisting driving to process the scene information, generate a VR scene, and display the VR scene for a user.

The fourth embodiment provides a method for assisting driving, the executive body thereof is an unmanned device. Where a VR (Virtual Reality) scene specifically refers to a scene built by means of VR technology, the VR scene can be displayed by a VR display device for a user to view.

The unmanned device may be performing an automatic driving task according to a preset driving route, driving strategy, or driving mode, when it encountered with problems such as complicated topography or complicated road conditions that cannot be solved on its own, it will trigger remote assisting automatic driving function. Where the trigger conditions for the unmanned device to trigger the remote assisting automatic driving function may be derived from the known art, which are not limited in the present disclosure.

When the unmanned device triggers the remote assisting automatic driving function, it initiates a request for remote assisting automatic driving to the device for assisting driving, and at the same time transmits the scene information currently captured together to the device for assisting driving for receiving and processing. Where the unmanned device receives the scene information transmitted by the unmanned device via a 5G mobile communication network.

Subsequently, the device for assisting driving will process the scene information received, generate a corresponding VR scene. Then, display the VR scene to the user, so that the user can trigger a remote assisting driving operation according to the VR scene; where the remote assisting driving operation is used to control the unmanned device to execute the driving operation.

That is to say, when the unmanned device triggers the remote assisting automatic driving function, the device for assisting driving receives the scene information, which is captured by the unmanned device, of the scene where the unmanned device is located. Where the scene information includes but not limited to image information or video information captured at multiple visual angles with the unmanned device as the center. The device for assisting driving processes the scene information, so as to build a VR scene of the scene where the unmanned device is located. The user may obtain the VR scene by the device for assisting driving, and trigger a remote assisting driving operation according to the VR scene obtained, enabling the unmanned device to execute a corresponding driving operation, getting out of the current predicament.

What differs from the known art is that, the VR technology enables a user to directly watch the images with extremely high scene reproduction of the VR scene of the environment where the unmanned device is located. Compared with the known art where a user obtains the scene of environment where the unmanned device is located merely depending on planar video images, the VR scene is more close to the actual scene for the information acquisition experience of the user, which is more helpful for the user to make a decision and initiate an accurate instruction for remote assisting driving, thus the driving safety of the unmanned device can be improved.

Preferably, after the transmitting the scene information to the device for assisting driving, the method further including: receiving and executing a remote assisting driving operation instruction returned by the device for assisting driving, the remote assisting driving operation instruction is triggered by the user according to the VR scene.

The method for assisting driving provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation.

Figure 6:
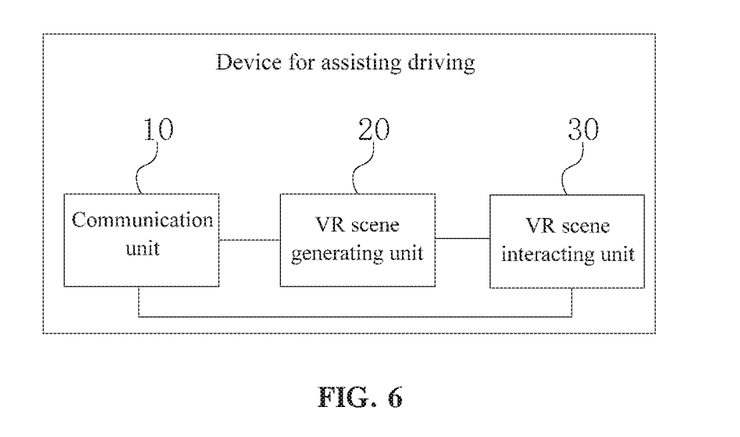
FIG. 6 is a schematic structure diagram of a device for assisting driving according to a fifth embodiment of the present disclosure.

FIG. 6 is a schematic structure diagram of a device for assisting driving according to a fifth embodiment of the present disclosure, as is shown in FIG. 6, the device for assisting driving including:

a communication unit 10, configured to receive scene information captured by an unmanned device when the unmanned device triggers remote assisting automatic driving function;

a VR scene generating unit 20 configured to process the scene information, and generate a VR scene; and a VR scene interacting unit 30, configured to display the VR scene for a user, so that the user can trigger a remote assisting driving operation according to the VR scene; where the remote assisting driving operation is used to control the unmanned device to execute the driving operation.

In an alternative embodiment, wherein the scene information includes image information of multiple environment angles of the unmanned device under the current environment; wherein, the image information of multiple environment angles is captured by the unmanned device at the same time;

Wherein the VR scene generating unit 20 is specifically configured to, synthesize and obtain, according to the environment angles corresponding to respective image information, environment image information of the current environment;

perform visual image processing to the environment image information, so as to obtain the VR scene including left eye environment image information and right eye environment image information.

In an alternative embodiment, wherein the scene information includes video information of multiple environment angles of the unmanned device under the current environment;

wherein the VR scene generating 20 unit is specifically configured to, perform framing processing to the video information of multiple environment angles, so as to obtain image data of multiple environment angles corresponding to one frame;

perform visual image processing to the image data of multiple environment angles of every frame, so as to obtain left eye environment image data and right eye environment image data of every frame;

according to the left eye environment image data and the right eye environment image data of every frame, obtain the VR scene.

In an alternative embodiment, the device further including: operation instruction generating unit;

the VR scene interacting unit 30 is configured to receive a remote assisting driving operation triggered by the user, after the displaying the VR scene for a user;

the operation instruction generating unit is configured to generate a corresponding operation instruction according to the remote assisting driving operation, such that the communication unit 10 can transmit the operation instruction to the unmanned device, the operation instruction is used for the unmanned device to execute the driving operation.

In an alternative embodiment, the communication unit 10 is further configured to receive at least one of a current configuration parameter of the unmanned device, an operating parameter of the unmanned device, and a measurement parameter of the environment where the unmanned device is located;

the VR scene interacting 30 unit is further configured to, while displaying the VR scene to the user, at the same time display at least one of the current configuration parameter of the unmanned device, the operating parameter of the unmanned device, and the measurement parameter of the environment where the unmanned device is located.

In an alternative embodiment, the communication unit 10 is specifically configured to receive the scene information transmitted by the unmanned device via a 5G mobile communication network.

A person skilled in the art can clearly understand that for the convenience and brevity of the description, the specific working process of the system described above and the corresponding beneficial effects can be referred to the corresponding processes in the foregoing method embodiments, and details are not described herein again.

Figure 7:
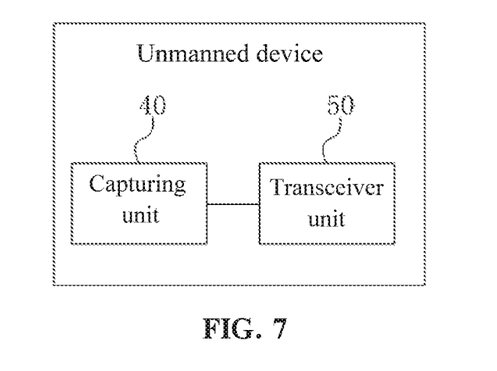
FIG. 7 is a schematic structure diagram of an unmanned device according to a sixth embodiment of the present disclosure.

The device for assisting driving provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information, generating a VR scene; displaying the VR scene for a user, so that the user can trigger a remote assisting driving operation according to the VR scene; where the remote assisting driving operation is used to control the unmanned device to execute the driving operation, FIG. 7 is a schematic structure diagram of an unmanned device according to a sixth embodiment of the present disclosure, as shown in FIG. 7, the unmanned device including:

a capturing unit 40, configured to capture scene information, when remote assisting automatic driving function is triggered;

a transceiver unit 50, configured to transmit the scene information to a device for assisting driving, enabling the device for assisting driving to process the scene information, generate a VR scene, and display the VR scene for a user.

In an alternative embodiment, further including an executing unit:

the transceiver unit, further configured to receive a remote assisting driving operation instruction returned by the device for assisting driving, the remote assisting driving operation instruction is triggered by the user according to the VR scene;

the executing unit, configure to execute the remote assisting driving operation instruction.

The unmanned device provided in the present disclosure, achieves the effects of providing a VR scene of the environment where the unmanned device is located to the user, improving effectively the user's environment engagement and perception of actual environment, which is helpful for the user to trigger an accurate remote assisting driving instruction, thus to ensure the driving safety of the unmanned device by: receiving scene information captured by an unmanned device, when the unmanned device triggers a remote assisting automatic driving function; processing the scene information by the device for assisting driving, generating a VR scene; displaying the VR scene for a user, so that the user can trigger a remote assisting driving operation according to the VR scene; where the remote assisting driving operation is used to control the unmanned device to execute the driving operation.

Figure 8:
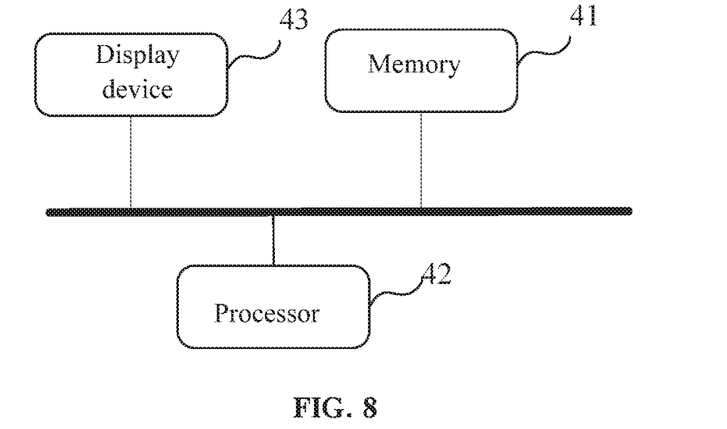
FIG. 8 is a schematic diagram illustrating hardware structure of a device for assisting driving according to a seventh embodiment of the present disclosure.

FIG. 8 is a schematic diagram illustrating hardware structure of a device for assisting driving according to a seventh embodiment of the present disclosure. As is shown in the FIG. 8, the device for assisting driving, including: a display device 43, a processor 42, and a computer program stored in the memory 41 and executable on the processor 42, the processor 42 is configured to execute the computer program so as to perform any of the methods according to the first to the third embodiment.

the display device 43 is coupled to the memory 41 and the processor 42, and configure to display a VR scene for a user by means of VR technology.

Figure 9:
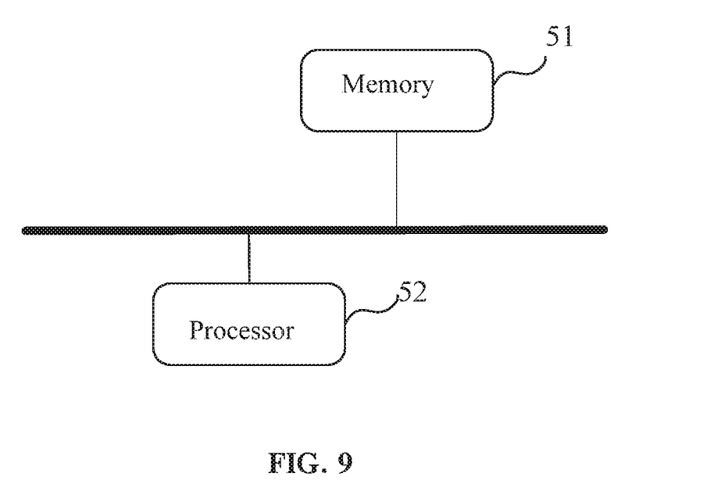
FIG. 9 is a schematic diagram illustrating hardware structure of an unmanned device according to an eighth embodiment of the present disclosure.

FIG. 9 is a schematic diagram illustrating hardware structure of an unmanned device according to an eighth embodiment of the present disclosure. As is shown in FIG. 9, the unmanned device including: a processor 52, and a computer program stored in the memory 51 and executable on the processor 52, the processor 52 is configured to execute the computer program so as to perform the method according to the fourth embodiment.

the present disclosure provides a computer-readable medium, including a program, and when the program code is executed by a terminal, any of the methods according to the first to the third embodiment is performed by the terminal.

the present disclosure provides a computer-readable medium, including a program, and when the program code is executed by a terminal, the method according to the fourth embodiment is performed by the terminal.

it can be understood by those ordinary skilled in the art that the whole or parts of the process of the method in the above embodiment can be realized by computer program instruction related hardware, the computer program may be stored in a computer readable storage medium, when the program is executed, steps of the embodiment of the above each method can be performed. The storage medium may comprise any medium that can store program codes, such as a ROM, RAM, magnetic disk storage or optical disk storage.

Finally, it is noted that the above embodiments are only used to explain the technical solution of the present disclosure and shall not be interpreted as limitation; Although the disclosure has been described in detail with reference to its embodiments, it should be understood by those ordinary skilled in the art that modifications or equivalent substitutions can be made to the technical solution of the present disclosure, such modifications or substitutions do not deviate the nature of the technical solution from the scope of the technical solution of the embodiments according to the present disclosure.

What is claimed is:
1. A method for assisting driving, comprising:
receiving scene information captured by an unmanned device, and receiving, a current configuration parameter of the unmanned device, an operating parameter of the unmanned device and a measurement parameter of an environment where the unmanned device is located, when the unmanned device triggers a remote assisting automatic driving function, wherein the current configuration parameter of the unmanned device, the oper- ating parameter of the unmanned device and the measurement parameter of the environment where the unmanned device is located are transmitted by the unmanned device, and the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located;

processing the scene information, generating a virtual reality (VR) scene; and displaying the VR scene, the current configuration parameter of the unmanned device, the operating parameter of the unmanned device and the measurement parameter of the environment where the unmanned device is located for a user at the same time, so that the user can trigger a remote assisting driving operation according to the VR scene, the current configuration parameter of the unmanned device, the operating parameter of the unmanned device and the measurement parameter of the environment where the unmanned device is located; wherein the remote assisting driving operation is used to control the unmanned device to execute the driving operation.

2. The method according to claim 1, wherein the scene information comprises image information of multiple environment angles of the unmanned device under the current environment; wherein, the image information of multiple environment angles is captured by the unmanned device at the same time;

correspondingly, the processing the scene information generating a VR scene comprises:

synthesizing and obtaining, according to the environment angles corresponding to respective image information, environment image information of the current environment;

performing visual image processing to the environment image information, so as to obtain the VR scene comprising left eye environment image information and right eye environment image information.

3. The method according to claim 1, wherein the scene information comprises video information of multiple environment angles of the unmanned device under the current environment;

correspondingly, the processing the scene information generating a VR scene comprises:

performing framing processing to the video information of multiple environment angles, so as to obtain image data of multiple environment angles corresponding to one frame;

performing visual image processing to the image data of multiple environment angles of every frame, so as to obtain left eye environment image data and right eye environment image data of every frame;

obtaining the VR scene, according to the left eye environment image data and the right eye environment image data of every frame.

4. The method according to claim 1, wherein after the displaying the VR scene for a user, the method further comprising:

receiving the remote assisting driving operation triggered by the user;

generating a corresponding operation instruction according to the remote assisting driving operation, and transmitting it to the unmanned device, so that the unmanned device executes the driving operation according to the operation instruction.

5. The method according to claim 1, wherein receiving the scene information transmitted by the unmanned device via a 5G mobile communication network.

6. A method for assisting driving, comprising:

capturing scene information, when a remote assisting automatic driving function is triggered;

transmitting the scene information to a device for assisting driving, and transmitting a current configuration parameter of an unmanned device, an operating parameter of the unmanned device and a measurement parameter of an environment where the unmanned device is located, enabling the device for assisting driving to process the scene information, generate a virtual reality (VR) scene, and display the VR scene, the current configuration parameter of the unmanned device, the operating parameter of the unmanned device and the measurement parameter of the environment where the unmanned device is located for a user at the same time, wherein the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located.

7. The method according to claim 6, wherein after the transmitting the scene information to the device for assisting driving, the method further comprises:

receiving and executing a remote assisting driving operation instruction returned by the device for assisting driving, wherein the remote assisting driving operation instruction is triggered by the user according to the VR scene.

8. A device for assisting driving, comprising: a processor; and a computer-readable medium for storing program codes, which, when executed by the processor, the processor is caused to:

receive scene information captured by an unmanned device, and receive, a current configuration parameter of the unmanned device, an operating parameter of the unmanned device and a measurement parameter of an environment where the unmanned device is located, when the unmanned device triggers remote assisting automatic driving function, wherein the current configuration parameter of the unmanned device, the operating parameter of the unmanned device and the measurement parameter of the environment where the unmanned device is located are transmitted by the unmanned device, and the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located;

process the scene information and generate a virtual reality (VR) scene; and display the VR scene, the current configuration parameter of the unmanned device, the operating parameter of the unmanned device and the measurement parameter of the environment where the unmanned device is located for a user at the same time, so that the user can trigger a remote assisting driving operation according to the VR scene, the current configuration parameter of the unmanned device, the operating parameter of the unmanned device; wherein the remote assisting driving operation is used to control the unmanned device to execute the driving operation.

9. The device according to claim 8, wherein the scene information comprises image information of multiple environment angles of the unmanned device under the current environment; wherein, the image information of multiple environment angles is captured by the unmanned device at the same time;

wherein the processor is further caused to:

synthesize and obtain, according to the environment angles corresponding to respective image information, environment image information of the current environment;

perform visual image processing to the environment image information, so as to obtain the VR scene comprising left eye environment image information and right eye environment image information.

10. The device according to claim 8, wherein the scene information comprises video information of multiple environment angles of the unmanned device under the current environment;

wherein the processor is further caused to:

perform framing processing to the video information of multiple environment angles, so as to obtain image data of multiple environment angles corresponding to one frame;

perform visual image processing to the image data of multiple environment angles of every frame, so as to obtain left eye environment image data and right eye environment image data of every frame;

obtain the VR scene, according to the left eye environment image data and the right eye environment image data of every frame.

11. The device according to claim 8, wherein the processor is further caused to:

receive a remote assisting driving operation triggered by the user, after the displaying the VR scene for a user;

generate a corresponding operation instruction according to the remote assisting driving operation, and transmit the operation instruction to the unmanned device, so that the unmanned device executes the driving operation according to the operation instruction.

12. The device according to claim 8, wherein the processor is further caused to: receive the scene information transmitted by the unmanned device via a 5G mobile communication network.

13. An unmanned device, comprising:

a processor; and a computer-readable medium for storing program codes, which, when executed by the processor, the processor is caused to:

capture scene information, when remote assisting automatic driving function is triggered; and transmit the scene information to a device for assisting driving, and transmit, a current configuration parameter of the unmanned device, an operating parameter of the unmanned device and a measurement parameter of an environment where the unmanned device is located, enabling the device for assisting driving to process the scene information, generate a virtual reality (VR) scene, and display the VR scene, the current configuration parameter of the unmanned device, the operating parameter of the unmanned device and the measurement parameter of the environment where the unmanned device is located for a user at the same time, wherein the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located.

14. The unmanned device according to claim 13, wherein the processor is further caused to:

receive a remote assisting driving operation instruction returned by the device for assisting driving, the remote assisting driving operation instruction is triggered by the user according to the VR scene;

execute the remote assisting driving operation instruction.

15. A device for assisting driving, comprising: a display device, a memory, a processor coupled to the memory, and a computer program stored in the memory and executable on the processor, the processor is configured to execute a computer program;

the display device is coupled to the memory and the processor, and configured to display a virtual reality (VR) scene for a user by means of VR technology; and wherein the computer program:

receives scene information captured by an unmanned device, and receives, a current configuration parameter of the unmanned device, an operating parameter of the unmanned device and a measurement parameter of an environment where the unmanned device is located, when the unmanned device triggers a remote assisting automatic driving function, wherein the current configuration parameter of the unmanned device, the operating parameter of the unmanned device and the measurement parameter of the environment where the unmanned device is located are transmitted by the unmanned device, and the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located;

processes the scene information, generating a VR scene; and displays the VR scene, the current configuration parameter of the unmanned device, the operating parameter of the unmanned device and the measurement parameter of the environment where the unmanned device is located for a user at the same time, so that the user can trigger a remote assisting driving operation according to the VR scene, the current configuration parameter of the unmanned device, the operating parameter of the unmanned device and the measurement parameter of the environment where the unmanned device is located;

wherein the remote assisting driving operation is used to control the unmanned device to execute the driving operation.

16. An unmanned device, comprising: a memory, a processor coupled to the memory, and a computer program stored in the memory and executable on the processor, the processor is configured to execute the computer program;

wherein the computer program:

captures scene information, when a remote assisting automatic driving function is triggered; and transmits the scene information to a device for assisting driving, and transmits, a current configuration parameter of the unmanned device, an operating parameter of the unmanned device and a measurement parameter of an environment where the unmanned device is located, enabling the device for assisting driving to process the scene information, generate a virtual reality (VR) scene, and display the VR scene, the current configuration parameter of the unmanned device, the operating parameter of the unmanned device and the measurement parameter of the environment where the unmanned device is located for a user at the same time, wherein the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located.

17. A non-transitory computer-readable medium, comprising a program, and when the program is executed by a terminal, the program performing the steps of:

receiving scene information captured by an unmanned device, and receiving, a current configuration parameter of the unmanned device, an operating parameter of the unmanned device and a measurement parameter of an environment where the unmanned device is located, when the unmanned device triggers a remote assisting automatic driving function, wherein the current configuration parameter of the unmanned device, the operating parameter of the unmanned device and the measurement parameter of the environment where the unmanned device is located are transmitted by the unmanned device, and the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located;

processing the scene information, generating a virtual reality (VR) scene; and displaying the VR scene, the current configuration parameter of the unmanned device, the operating parameter of the unmanned device and the measurement parameter of the environment where the unmanned device is located for a user at the same time, so that the user can trigger a remote assisting driving operation according to the VR scene, the current configuration parameter of the unmanned device, the operating parameter of the unmanned device and the measurement parameter of the environment where the unmanned device is located;

wherein the remote assisting driving operation is used to control the unmanned device to execute the driving operation.

18. A non-transitory computer-readable medium, comprising a program, and when the program is executed by a terminal, the program performs the steps of:

capturing scene information, when a remote assisting automatic driving function is triggered; and transmitting the scene information to a device for assisting driving, and transmitting, a current configuration parameter of the unmanned device, an operating parameter of the unmanned device and a measurement parameter of an environment where the unmanned device is located, enabling the device for assisting driving to process the scene information, generate a virtual reality (VR) scene, and display the VR scene, the current configuration parameter of the unmanned device, the operating parameter of the unmanned device and the measurement parameter of the environment where the unmanned device is located for a user at the same time, wherein the current configuration parameter of the unmanned device comprises a model number, an automatic driving mode and a currently ongoing task of the unmanned device, the operating parameter of the unmanned device comprises a speed, an acceleration, a vehicle processing operating status and a vehicle inclination of the unmanned device, the measurement parameter of the environment where the unmanned device is located comprises a distance between the unmanned device and an obstacle in the environment where the unmanned device is located, a weather parameter of the environment where the unmanned device is located, and the ground surface or topography status of the environment where the unmanned device is located.

* * * * *